Oct. 23, 1951        G. HERTZ        2,572,722
COVERING DEVICE
Filed Feb. 26, 1946
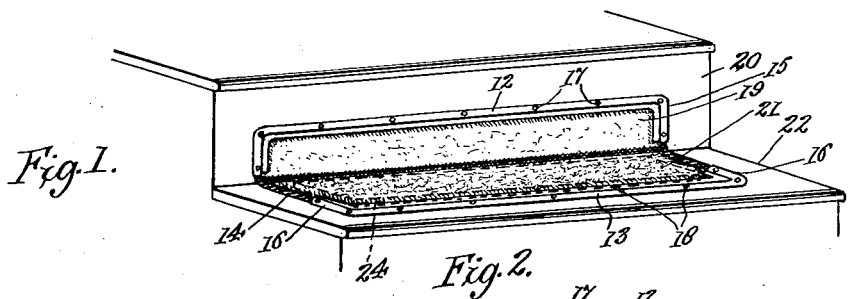
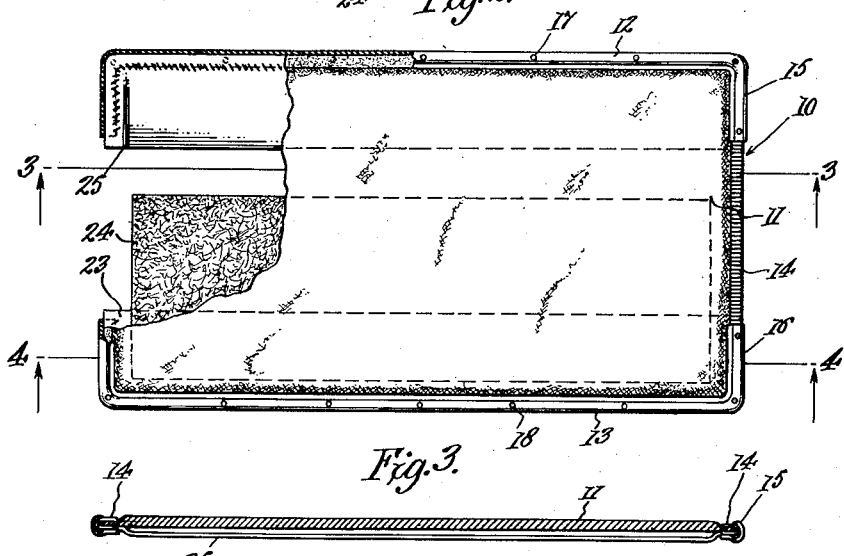
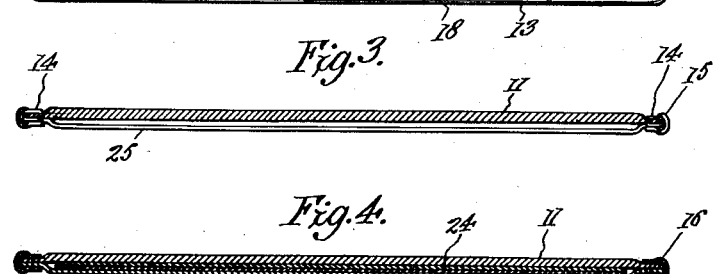
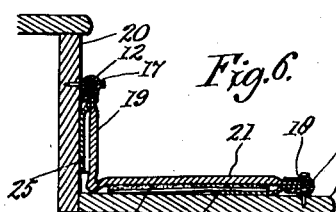
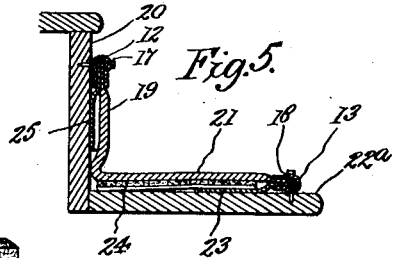
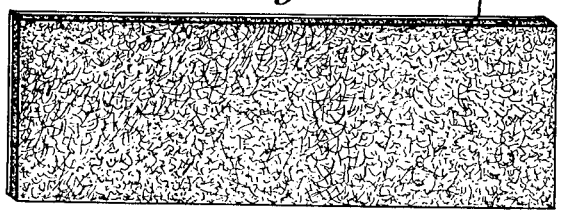
INVENTOR.
George Hertz
BY Thomas F. Healy
Attorney Patented Oct. 23, 1951

2,572,722

UNITED STATES PATENT OFFICE 2,572,722

COVERING DEVICE

George Hertz, Washington, D. C.

Application February 26, 1946, Serial No. 650,198

5 Claims. (Cl. 20—79)

The present invention relates to a covering and more particularly to a flexible covering for attachment to the tread and riser of a step.

An object of the invention is to provide a covering including a body portion having means associated with the underside thereof to removably receive a padded element.

A further object is to provide a flexible stair covering for the tread and riser of a step, so constructed that the said covering may be folded at any desired point along its widthwise edges to vary the size of the riser portion of the covering relative to the tread portion thereof.

Still another object is to provide a flexible covering for the tread and riser of a step, and having stiffening means for a portion of the edges of said flexible covering to provide a flexible area of substantial width to permit the width of riser portion of the covering or the width of the tread portion of the covering to be selectively varied.

Yet another object is to provide a flexible covering for attachment to the tread and riser of a step having two oppositely disposed pockets on the underside of the covering, each adapted to removably receive a padded element; with one of said pockets underlying the riser portion of the covering and the other pocket underlying the tread portion of the covering; and wherein the padded element can be interchanged from the tread pocket to the riser pocket, and the more or less worn tread portion of the covering can be made the riser portion and the unworn riser portion becomes the tread portion.

Another object of this invention is to provide a stair covering having continuous variable riser and tread portions which can be fitted to stairs of various dimensions without cutting or other alteration.

This invention generally embraces the features of providing means for reversing the relative relationship of the tread and riser portions of a stair covering and also the combination of said tread-riser variable means with means for changing the width of the riser portion of the stair covering with reference to the width of the tread portion thereof.

Other and further objects and advantages of this invention will be apparent from the following description thereof, and from the claims appended thereto.

In the drawing, wherein like numerals refer to like or corresponding parts throughout the several views, Figure 1 is a perspective view showing the stair covering embodying the features of the invention as attached to the tread and riser of a step, Figure 2 is a top plan view of the stair covering with parts broken away to show a padded element fitted into a pocket on the underside of the covering, Figure 3 is a sectional view taken along the line 3—3 of Figure 2 in the direction of the arrows, Figure 4 is a sectional view taken along the line 4—4 of Figure 2 in the direction of the arrows, Figure 5 is a sectional detail showing the stair covering attached to a step having one size of tread, Figure 6 is a view similar to that in Figure 5, but having the stair covering attached to a step having a tread of a different width, and Figure 7 is a plan view of the padded insert element.

Referring now to the drawing, the numeral 10 generally indicates a covering element, as for example, a stair covering. The covering 10 is provided with a fabric portion 11, and stiffening rods 12 and 13 secured to the lengthwise edges of the covering 11, and partially extending along the widthwise edge of said covering 11, to provide a flexible area 14, of substantial width between the portions 15 and 16 of the stiffening elements 12 and 13 respectively, which portions 15 and 16 extend along the widthwise edges of covering 10, and terminate substantially short of each other to provide a flexible area 14 within which the said covering 10 may be folded at any desired point.

The stiffening elements 12 and 13 are preferably brass elements which are clamped to the marginal edges of the flexible fabric 11, and are each preferably identical in shape and size, and with each provided with a plurality of spaced apart openings 17 and 18 respectively, adapted to receive nails or the like.

For convenience of illustration, the flexible fabric 11, as is best shown in Figure 1, is provided with a riser portion 19, adapted to be secured to the riser 20 of a step, by means of inserting screws, nails, or the like, through the apertures 17, disposed in the stiffening element 12. Likewise, there is provided a tread portion 21, of the fabric 11, which is secured to the tread 22 of a step by means of screws, nails or the like.

On the underside of the tread portion 21, of the fabric covering 11, there is provided a pocket 23, which is secured to the underside of the fabric 11 in any suitable manner as by elements 12, 13, 15 and 16. A padded element or insert 24 is removably secured in said pocket 23, to provide a cushion for the tread portion 21, of the fabric 11.

On the underside of the riser portion of the fabric portion 11, there is provided a second pocket 25, which is secured to the underside of the fabric 11 in any suitable manner.

If desired, holding clamps or the like can be substituted for the pockets 23 and 25 respectively. The holding means need only be adaptable to removably receive the padded insert 24.

The primary feature of this invention presides in the reversability of the tread portion 21, with the riser portion 19, upon excess wearing of said tread portion 21, due to usage. When it is desired to interchange the riser portion 19 with the tread portion 21, the fastening elements are removed from the apertures 17 and 18, the padded insert 24 is removed from pocket 23, and inserted into pocket 25, the covering 11, is turned about, and what was the tread portion 21, now becomes the riser portion 19, and what was the riser portion 19, now becomes the tread portion 21, to thus present an unworn fabric covering on the tread of the step.

It is to be noted that the relative widths of the tread portion 21 and the riser portion 19 may be varied, as a substantially flexible area of bend is provided at 14. Figures 5 and 6 illustrate the attachment of the adjustable and reversible stair cushion 10, to steps having different size treads 22-a and 22-b, respectively.

In order to present an attractive appearance, it is preferred to employ overcast serging binding along the flexible area 14, of the fabric 11, preferably of the same color as the brass frames or stiffening elements 12 and 13, respectively. It is preferred to tack the edges of the flexible area 14 to the tread of the step 22.

While I have shown the stiffening elements 12 and 13, as being identical in structure, yet it is possible to have said elements 12 and 13 dissimilar in structure. Also, while it is preferred to use metal in the stiffening elements, I may also employ wood, plastics or the like.

While it is preferred that the portions 15 and 16 of the stiffening elements 12 and 13 respectively extend only a short distance along the widthwise edges of the fabric 11, it is within the scope of the present invention to either eliminate the portions 15 and 16 altogether, or bring the terminal edges thereof more closely together and to reduce the width of the flexible area 14. However, it should be borne in mind that if the fabric 11 is to be adjustable for various-sized risers and treads, the width of the flexible area 14 should be rather substantial.

If the feature of adjustability is not of importance, and the reversible feature is desired, the flexible area 14 of the fabric 11, may be very small, or said flexible area can be eliminated altogether. In this instance, the fabric 11 may be made of any desired material, such as linoleum, or the like. In other words, unless the adjustability feature of the stair covering is desired, any non-flexible material may also be employed as a substitute for the relatively flexible fabric 11. The feature of exchanging the pad from pocket 23 to pocket 25, to reverse the cushion portion of the covering, proceeds as explained hereintofor.

It is obvious that various modifications of the present invention will be apparent to those skilled in the art without departing from the spirit of this invention, and it is therefore desired to be limited only to the scope of the appended claims.

What I claim is:

1. A stair covering device comprising, a flexible covering adapted to overlie the tread and project upon the riser of a step and having a tread portion and riser portion, a stiffening element extending along the lengthwise edge of said covering and along a portion of the widthwise edges thereof, a second identical stiffening element oppositely disposed from said first mentioned stiffening element and extending along the lengthwise edge of said covering and along a portion of the widthwise edges thereof to terminate short of the widthwise portions of the oppositely disposed first mentioned stiffening element to provide a flexible area of substantial width therebetween within which the said covering may be folded at any desired point to vary the size of the riser portion of the covering relative to the tread portion thereof, said tread and riser portions being reversible, a pocket disposed on the underside of said covering underlying and extending along substantially the full length of the forward edge of the tread portion thereof and attached thereto, said pocket having side edges extending rearwardly from said front edge and along the side edges of the tread portion and attached thereto and having a free rear edge, a second pocket having substantially the same relation to the riser portion as the first pocket has to the tread portion, and a padded element disposed within the first pocket and removable therefrom and insertable in said second pocket.

2. A stair covering device for attachment to the tread and riser of a step, comprising a flexible covering having a tread portion and a riser portion, a stiffening element extending along the lengthwise edge of said covering and along a portion of the widthwise edges thereof, a second identical stiffening element oppositely disposed from said first mentioned stiffening element and extending along the lengthwise edge of said covering and along a portion of the widthwise edges thereof to terminate short of the widthwise portions of the oppositely disposed first mentioned stiffening element to provide a flexible area of substantial width therebetween within which the said covering may be folded at any desired point to vary the size of the riser portion of the covering relative to the tread portion thereof, a sheet of material having its front and side edges connected to the under face of said tread portion by said first stiffening element and having its rear edge free to provide a pocket, a second sheet of material having its rear and side edges connected to the under face of said riser portion by said second stiffening element and having its front edge free to provide a pocket, and a padded element disposed within the pocket of the tread portion, said tread and riser portions being reversible so that said tread portion may be used as a riser portion and the first mentioned riser portion may be used as a tread portion and said padded element being removable from the pocket of the tread portion and insertable in the other pocket.

3. A stair covering device comprising, a flexible covering adapted to overlie the tread and project up on the riser of a step and having a tread portion and a riser portion, a stiffening element extending along the lengthwise edge of said covering and along a portion of the widthwise edges thereof, a second stiffening element oppositely disposed from said first mentioned stiffening element and extending along the other lengthwise edge of said covering and along a portion of the widthwise edges thereof to terminate short of the widthwise portion of the oppositely disposed first mentioned stiffening element to provide a flexible area of substantial width therebetween within which the said covering may be folded at any desired point to vary the size of the riser portion of the covering relative to the tread portion thereof, a pocket for a padded element disposed on the underside of said covering underlying the tread portion thereof, a second pocket adapted to hold a padded element disposed on the underside of said covering underlying the riser portion thereof, a padded element removably disposed in one of said pockets.

4. A stair covering device comprising, a flexible covering adapted to overlie the tread and project upon the riser of a step and having a tread portion and a riser portion, a stiffening element extending along the lengthwise edge of said covering and along a portion of the widthwise edges thereof, a second stiffening element oppositely disposed from said first mentioned stiffening element and extending along the other lengthwise edge of said covering and along a portion of the widthwise edges thereof to terminate short of the widthwise portion of the oppositely disposed first mentioned stiffening element to provide a flexible area of substantial width therebetween within which the said covering may be folded at any desired point to vary the size of the riser portion of the covering relative to the tread portion thereof, a pocket for a padded element disposed on the underside of said covering and underlying the tread portion thereof, a second pocket similar to said first mentioned pocket disposed on the underside of said covering underlying the riser portion thereof and adapted to hold said padded element.

5. A stair covering device for attachment to the tread and riser of a step comprising, a flexible covering having a tread portion and a riser portion, stiffening means for a portion of the edges of said flexible covering to permit the said covering to be folded at any desired point along the flexible portion of its widthwise edges to vary the size of the riser portion of the covering relative to the tread portion thereof, a pocket disposed on the underside of said covering constructed to removably receive a padded element, a second pocket disposed on the underside of said covering opposite from said first mentioned pocket, whereby the said removable padded element may be interchanged in said pockets to reverse the relative positions of the riser and tread portions of the covering with reference to the step.

GEORGE HERTZ.

REFERENCES CITED

The following references are of record in the file of this patent:

UNITED STATES PATENTS

| Number | Name | Date |
|---|---|---|
| 668,101 | Hinde | Feb. 12, 1901 |
| 834,011 | Leffler | Oct. 23, 1906 |
| 1,292,889 | Saponoff | Jan. 28, 1919 |
| 1,520,042 | Wallisch et al. | Dec. 23, 1924 |
| 1,662,611 | Hyman | Mar. 13, 1928 |
| 1,921,781 | Sachs | Aug. 8, 1933 |
| 2,237,224 | Herschmann | Apr. 1, 1941 |

FOREIGN PATENTS

| Number | Country | Date |
|---|---|---|
| 129,545 | Great Britain | July 17, 1919 |